(12) United States Patent
Higuchi

(10) Patent No.: US 10,263,819 B2
(45) Date of Patent: Apr. 16, 2019

(54) RADIO TRANSMITTING APPARATUS, RADIO RECEIVING APPARATUS, AND RADIO TRANSMITTING METHOD

(71) Applicant: Renesas Electronics Corporation, Koutou-ku, Tokyo (JP)

(72) Inventor: Mitsuhiko Higuchi, Tokyo (JP)

(73) Assignee: Renesas Electronics Corporation, Tokyo ( * ) Notice: Subject to any disclaimer, the term of this patent is extended or adjusted under 35 U.S.C. 154(b) by 0 days.

(21) Appl. No.: 15/898,170

(22) Filed: Feb. 15, 2018

(65) Prior Publication Data
US 2018/0316533 A1 Nov. 1, 2018

(30) Foreign Application Priority Data
Apr. 28, 2017 (JP) .................................. 2017-089188

(51) Int. Cl.
*H04L 27/26* (2006.01)

(52) U.S. Cl.
CPC ...... *H04L 27/2608* (2013.01); *H04L 27/2626* (2013.01); *H04L 27/2646* (2013.01)

(58) Field of Classification Search
CPC ............ H04L 27/2608; H04L 27/2626; H04L 27/2646
See application file for complete search history.

(56) References Cited

U.S. PATENT DOCUMENTS

| | | | |
|---|---|---|---|
| 6,839,322 B1* | 1/2005 | Ashwood Smith | H04L 49/25 370/235 |
| 8,908,496 B2* | 12/2014 | Kadous | H03M 13/33 370/216 |
| 9,154,274 B2* | 10/2015 | Walton | H04B 7/0421 |
| 9,614,605 B1* | 4/2017 | Narasimhan | H04B 7/068 |
| 9,655,088 B2* | 5/2017 | Xu | H04W 72/0413 |
| 2005/0276245 A1* | 12/2005 | Hidaka | H04L 1/0009 370/328 |
| 2006/0281487 A1* | 12/2006 | Girardeau, Jr. | H04L 27/2601 455/553.1 |
| 2007/0079211 A1* | 4/2007 | Kwak | H03M 13/091 714/758 |
| 2010/0091735 A1* | 4/2010 | Kim | H04L 1/0041 370/331 |
| 2011/0269498 A1* | 11/2011 | Li | H04B 7/024 455/524 |

FOREIGN PATENT DOCUMENTS

JP 2002-191073 A 7/2002

OTHER PUBLICATIONS

Bluetooth Core Specification v 5.0, Dec. 6, 2016.

* cited by examiner

*Primary Examiner* — Jean B Corrielus
(74) *Attorney, Agent, or Firm* — Shapiro, Gabor and Rosenberger, PLLC

(57) ABSTRACT

In a radio transmitting apparatus 10, a radio transmitting unit (radio transmitter) 13 repeatedly transmits a plurality of divided data units generated by a control unit (controller) 11 while cyclically shifting, among a plurality of transmission channels, a transmission channel to be used for transmitting each of the divided data units over a plurality of transmission interval periods.

6 Claims, 9 Drawing Sheets

| DIVISION NUMBER Ndiv | REPEAT NUMBER Mloop |
|---|---|
| 1 ≦ Ndiv < 4 | 10 |
| 4 ≦ Ndiv < 16 | 20 |
| 16 ≦ Ndiv < 64 | 40 |
| 64 ≦ Ndiv | 60 |

RADIO TRANSMITTING APPARATUS, RADIO RECEIVING APPARATUS, AND RADIO TRANSMITTING METHOD

CROSS-REFERENCE TO RELATED APPLICATIONS

This application is based upon and claims the benefit of priority from Japanese patent application No. 2017-089188, filed on Apr. 28, 2017, the disclosure of which is incorporated herein in its entirety by reference.

BACKGROUND

The present disclosure relates to a radio transmitting apparatus, a radio receiving apparatus, and a radio transmitting method.

In related art, a technique of wirelessly transmitting a plurality of divided data pieces obtained by dividing transmission data by using a plurality of frequencies has been disclosed (e.g., Japanese Unexamined Patent Application Publication No. 2002-191073, Bluetooth Core Specification v 5.0).

SUMMARY

In the above related art, the case in which a receiving apparatus cannot receive divided data pieces is not at all considered. Thus, there is a possibility that the receiving apparatus cannot efficiently receive the plurality of divided data pieces.

Other problems of the related art and new features of the present disclosure will become apparent from the following descriptions of the specification and attached drawings.

According to an example aspect, a plurality of divided data units obtained by dividing a data unit are repeatedly transmitted while cyclically shifting, among a plurality of transmission channels, a transmission channel to be used for transmitting each of the divided data units over a plurality of transmission interval periods.

According to the above example aspect, efficiency of data transmission can be improved.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
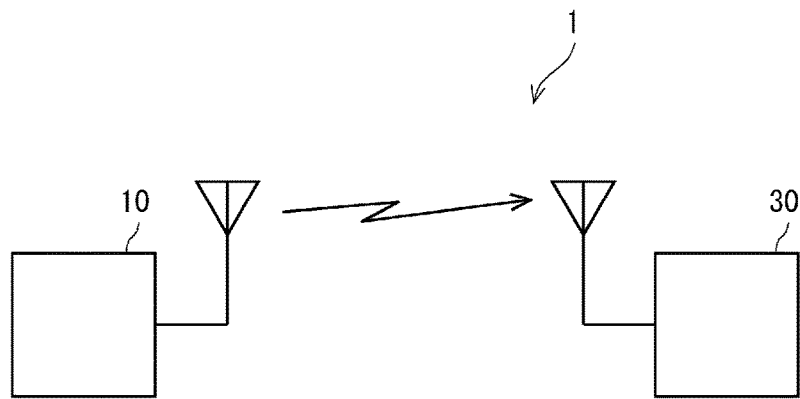
FIG. 1 is a diagram showing an example of a radio communication system according to a first embodiment.

Hereinafter, embodiments will be described with reference to the drawings. Note that the same elements are denoted by the same reference numerals, and repeated descriptions are omitted.

First Embodiment

<Outline of Radio Communication System>

FIG. 1 is a diagram showing an example of a radio communication system according to the first embodiment. In FIG. 1, a radio communication system 1 includes a radio transmitting apparatus 10 and a radio receiving apparatus 30.

The radio transmitting apparatus 10 wirelessly transmits a plurality of divided data units, which are obtained by dividing one data unit, over a plurality of transmission channels (i.e., transmission frequencies). Then, the radio receiving apparatus 30 can receive the plurality of divided data units wirelessly transmitted from the radio transmitting apparatus 10 over one or more reception channels.

Here, the radio standard corresponding to radio communication between the radio transmitting apparatus 10 and the radio receiving apparatus 30 is not limited in particular. The radio standard is, for example, Bluetooth Low Energy (registered trademark). In the following descriptions, it is assumed that the radio standard corresponding to the wireless communication between the radio transmitting apparatus 10 and the radio receiving apparatus 30 is Bluetooth Low Energy (registered trademark).

In Bluetooth Low Energy (registered trademark), a first communication scheme and a second communication scheme are defined. In the first communication scheme, data is transmitted after a connection is established between two radio communication apparatuses. In the second communication scheme, data is transmitted while a connection is not established between the two radio communication apparatuses. In the second communication scheme, a transmitting apparatus broadcasts data by an advertising operation, and a receiving apparatus receives the data by a scan operation.

In this case, it is assumed that the second communication scheme is applied to communication between the radio transmitting apparatus 10 and the radio receiving apparatus 30. That is, the radio transmitting apparatus 10 broadcasts the plurality of divided data units over a plurality of transmission channels.

Configuration Example of Radio Transmitting Apparatus

Figure 2:
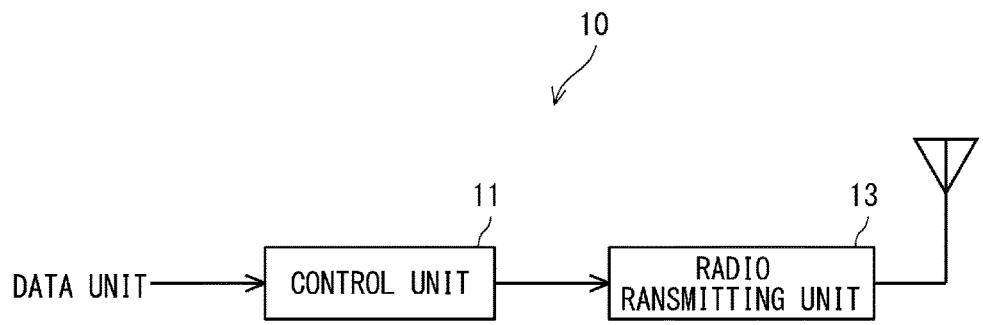
FIG. 2 is a block diagram showing an example of a radio transmitting apparatus according to the first embodiment.

FIG. 2 is a block diagram showing an example of the radio transmitting apparatus according to the first embodiment. In FIG. 2, the radio transmitting apparatus 10 includes a control unit (controller) 11 and a radio transmitting unit (radio transmitter) 13.

The control unit 11 divides a data unit to generate a plurality of divided data units.

The radio transmitting unit 13 repeatedly transmits the plurality of divided data units (repeatedly broadcasts the divided data units) generated by the control unit 11 while cyclically shifting, among the plurality of transmission channels, the transmission channel used for transmitting each of the divided data units over a plurality of transmission interval periods. That is, in the radio transmitting unit 13, a first divided data unit, which has been transmitted over a first transmission channel in a first transmission interval period, is transmitted over a second transmission channel, which is different from the first transmission channel, in a second transmission interval period following the first transmission interval period. The second transmission channel is, for example, a channel adjacent to the first transmission channel in the plurality of transmission channels. Further, when the number of divided data units (i.e., the number of divisions) is greater than the number of transmission channels, during the transmission interval period, the divided data units included in a group of divided data units to be transmitted are cyclically shifted and changed.

Configuration Example of Radio Receiving Apparatus

Figure 3:
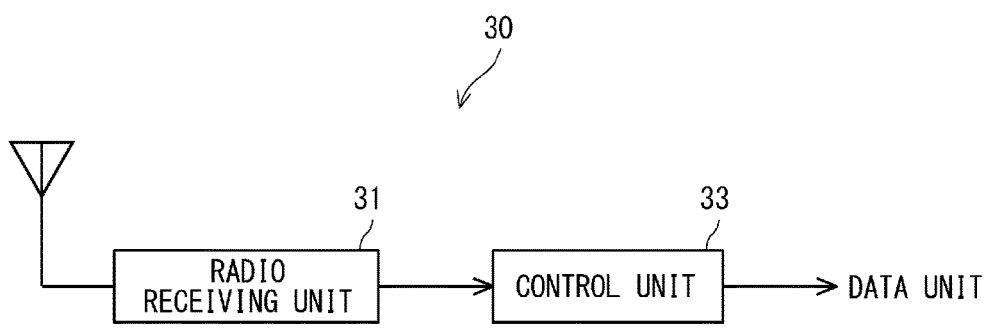
FIG. 3 is a block diagram showing an example of a radio receiving apparatus according to the first embodiment.

FIG. 3 is a block diagram showing an example of a radio receiving apparatus according to the first embodiment. In FIG. 3, the radio receiving apparatus 30 includes a radio receiving unit (radio receiver) 31 and a control unit (controller) 33.

In one reception interval period, the radio receiving unit 31 executes reception processing in one reception channel among a plurality of reception channels. Then, when the radio receiving unit 31 succeeds in receiving, in the one reception interval period, a previous divided data unit over one reception channel, the radio receiving unit 31 executes, in a next reception interval period following the one reception interval period, the reception processing for receiving the next divided data unit following the previous divided data unit over the one reception channel. On the other hand, when the radio receiving unit 31 fails to receive, in the one reception interval period, the previous divided data unit over the one reception channel, the radio receiving unit 31 executes, in the next reception interval period, the reception processing for receiving the previous divided data unit over another reception channel different from the one reception channel. The radio receiving unit 31 repeats such reception processing over a plurality of reception interval periods. Here, one reception interval period corresponds to one transmission interval period.

That is, when the radio receiving unit 31 succeeds in receiving, in a first reception interval period, a first divided data unit over a first reception channel, it attempts to receive, in a second reception interval period following the first reception interval period, a second divided data unit following the first divided data unit also over the first reception channel. Here, the first reception interval period corresponds to the above-described first transmission interval period. Moreover, the first reception channel corresponds to the above-described first transmission channel.

On the other hand, when the radio receiving unit 31 fails to receive, in the first reception interval period, the first divided data unit over the first reception channel, it attempts to receive, in the second reception interval period following the first reception interval period, the first divided data unit over a second reception channel that is different from the first reception channel. Here, the second reception channel corresponds to the above-described second transmission channel.

The control unit 33 couples the plurality of divided data units received by the radio receiving unit 31 in order to form (recreate) the original data unit (i.e., the data unit before being divided by the radio transmitting apparatus 10).

As described so far, according to the first embodiment, in the radio transmitting apparatus 10, the radio transmitting unit 13 repeatedly transmits the plurality of divided data units generated by the control unit 11 while cyclically shifting, among the plurality of transmission channels, the transmission channel used for transmitting each of the divided data units over a plurality of transmission interval periods.

With this configuration of the radio transmitting apparatus 10, when the radio receiving apparatus 30 fails to receive, in the first receiving period, the first divided data unit over the first reception channel, it can attempt to receive, in the second reception interval period following the first reception interval period, the first divided data unit over the second reception channel that is different from the first reception channel. In this way, there is an opportunity to receive, in the second reception interval period following the first reception interval period, the first divided data unit that fails to be received during the first reception interval period. It is thus possible to efficiently receive data. Moreover, it is possible to switch the first reception channel, over which the first divided data unit fails to be received in the first reception interval period, to the second reception channel that is different from the first reception channel in the second reception interval period. Therefore, the probability of successful reception can be increased. Consequently, the data can be efficiently received. That is, efficiency of data transmission can be improved.

Second Embodiment

In a second embodiment, the configurations and the processing operations of the radio transmitting apparatus and the radio receiving apparatus will be described in more detail. Note that as the radio communication system according to the second embodiment is the same as the radio communication system 1 of the first embodiment, a reference can be made to FIG. 1.

Configuration Example of Radio Transmitting Apparatus

Figure 4:
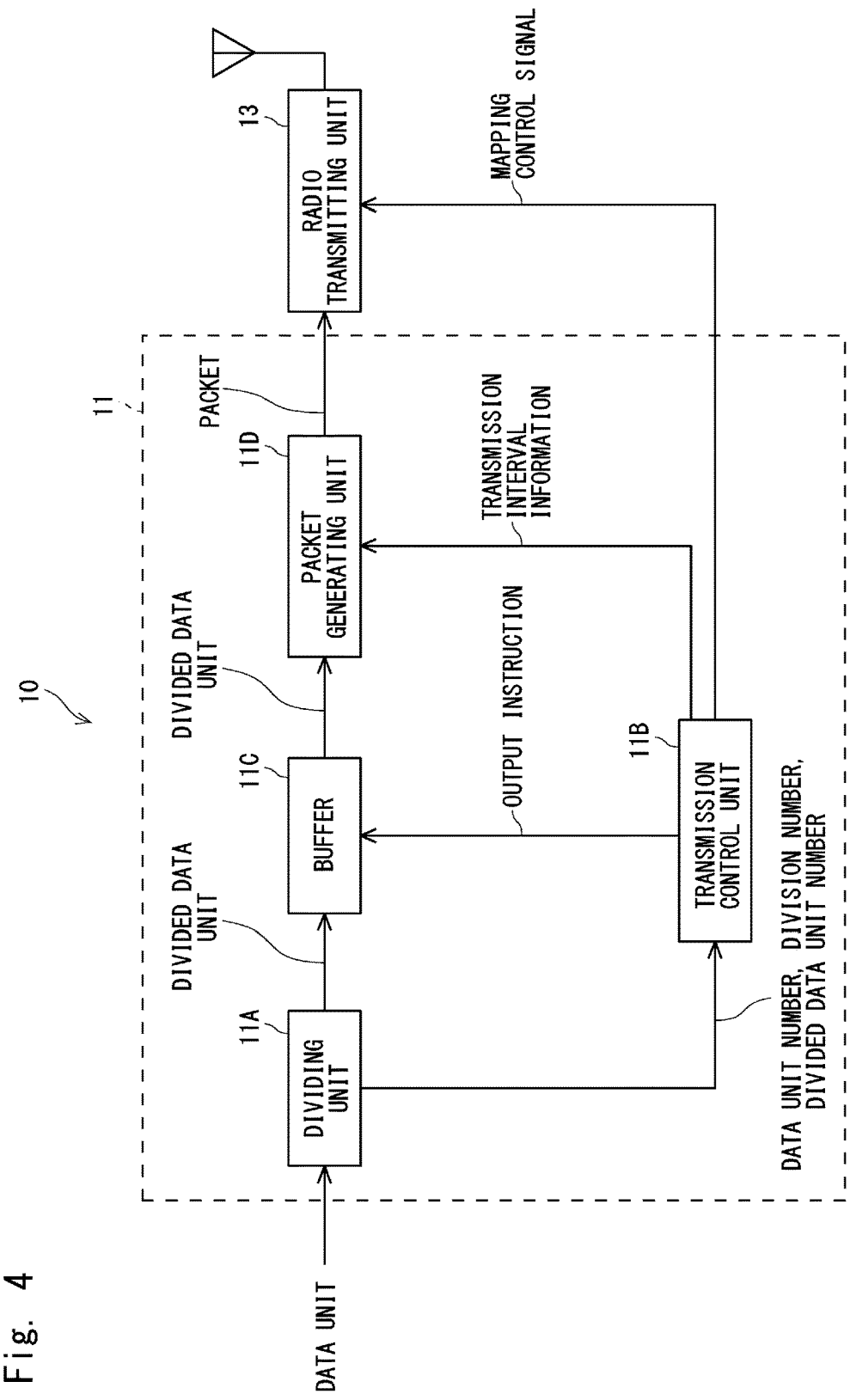
FIG. 4 is a block diagram showing an example of a radio transmitting apparatus according to a second embodiment.

FIG. 4 is a block diagram showing an example of the radio transmitting apparatus according to the second embodiment. In FIG. 4, the radio transmitting apparatus 10 according to the second embodiment includes a control unit 11 and a radio transmitting unit 13. The control unit 11 includes a dividing unit (divider) 11A, a transmission control unit (transmission controller) 11B, a buffer 11C, and a packet generating unit (packet generator) 11D.

The dividing unit 11A inputs the data units. The data unit input to the dividing unit 11A is for example, image data photographed by a camera and is provided with a data unit number $ID_{data}$.

Then, the dividing unit 11A divides the input data unit and generates $N_{div}$ ($N_{div}$ is a natural number of two or greater) divided data units. Then, the dividing unit 11A provides a divided data unit number $N_{index}$ to each divided data unit. Next, the dividing unit 11A outputs, to the buffer 11C, a set of each divided data unit, information indicating the division number $N_{div}$, information indicating the divided data unit number of the corresponding divided data unit, and information indicating the data unit number $N_{index}$. Further, the dividing unit 11A outputs, to the transmission control unit 11B, a set of the information indicating the division number $N_{div}$, the information indicating the divided data unit number $N_{index}$ of the corresponding divided data unit, and the information indicating the data unit number $ID_{data}$. Here, the division number $N_{div}$ is determined by dividing a size of the data unit by a payload size of a packet, which will be described later. That is, when the size of the data unit is greater than the payload size, the dividing unit 11A divides the data unit.

The buffer 11C holds each set including the information indicating the division number $N_{div}$, the information indicating the divided data unit number of the corresponding divided data unit, and the information indicating the data unit number, which is received from the dividing unit 11 A. Then, the buffer 11C outputs, to the packet generating unit 11D, the set including the same divided data unit number as that included in an output instruction received from the transmission control unit 11B.

Figure 5:
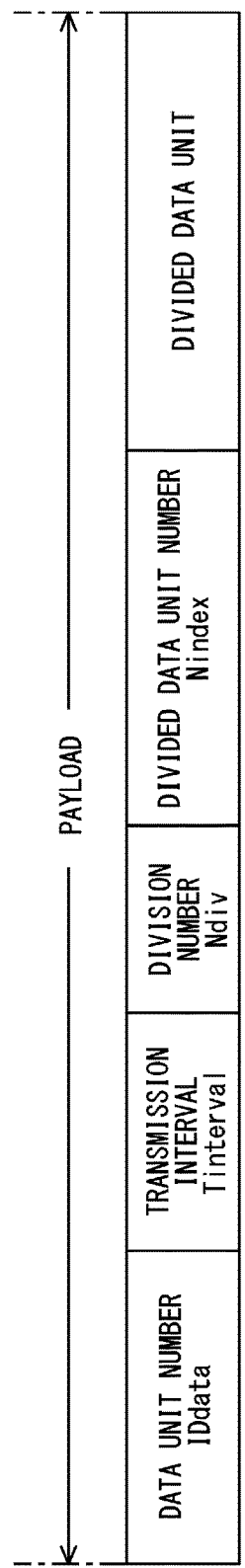
FIG. 5 is a diagram showing an example of a format of a packet payload.

The packet generating unit 11D generates a packet with a payload including the above set received from the buffer 11C and information indicating a transmission interval received from the transmission control unit 11B. FIG. 5 is a diagram showing a format example of the payload of the packet.

Then, the packet generating unit 11D outputs the generated packet to the radio transmitting unit 13.

The transmission control unit 11B determines a transmission interval $T_{interval}$. For example, the transmission control unit 11B calculates the transmission interval $T_{interval}$ by multiplying a packet transmission time required for transmitting one packet by the number of transmission channels used for transmitting the divided data units. Then, the transmission control unit 11B outputs information indicating the determined transmission interval $T_{interval}$ to the packet generating unit 11D.

Further, in each transmission interval period, the transmission control unit 11B outputs, to the buffer 11C, the output instruction including the divided data unit number indicating the divided data unit included in the group of divided data units to be transmitted in the corresponding transmission interval period. For example, when the number of divided data units (i.e., the division number $N_{div}$) is greater than the number of transmission channels M, the transmission control unit 11B cyclically shifts and changes the divided data units constituting the group of divided data units to be transmitted among the transmission interval periods. The output instruction of the transmission control unit 11B is repeatedly output, for example, by a preset fixed repeat number $M_{loop}$.

Further, the transmission control unit 11B outputs, to the radio transmitting unit 13, a mapping control signal indicating a correspondence relation between the respective divided data unit included in the group of divided data units to be transmitted in the corresponding transmission interval periods and the respective transmission channels over which the divided data units are transmitted.

Under such control of the transmission control unit 11B, the radio transmitting unit 13 is configured to be capable of transmitting M (M is a natural number or two or greater and $N_{div}$ or less) divided data units in one transmission interval period over the M transmission channels. Then, the radio transmitting unit 13 can repeatedly transmit the $N_{div}$ divided data units over the M transmission channels while cyclically shifting, among the M transmission channels, the transmission channel for each of the $N_{div}$ divided data units over the plurality of transmission interval periods.

Configuration Example of Radio Receiving Apparatus

Figure 6:
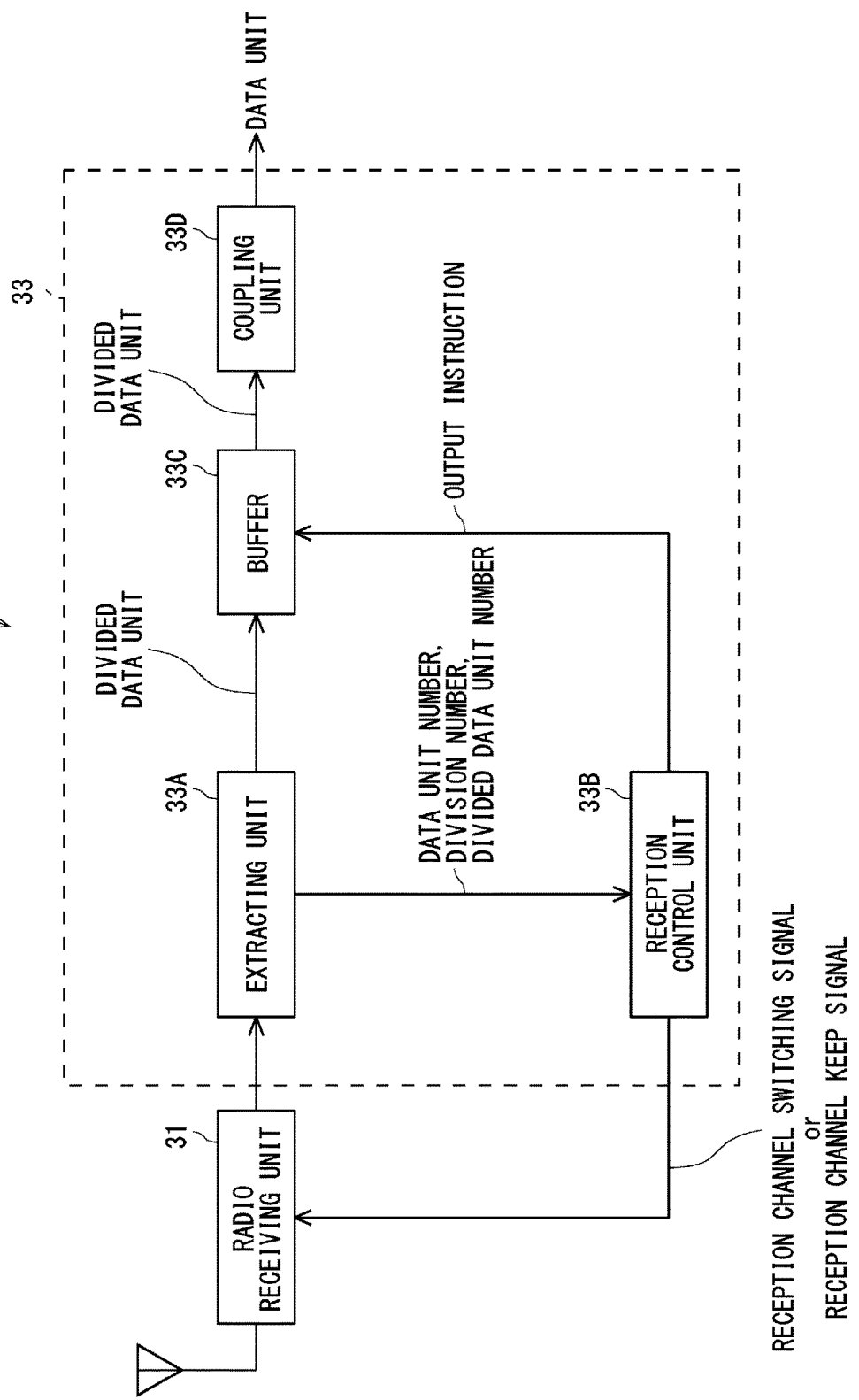
FIG. 6 is a block diagram showing an example of a radio receiving apparatus according to the second embodiment.

FIG. 6 is a block diagram showing an example of the radio receiving apparatus according to the second embodiment. In FIG. 6, the radio receiving apparatus 30 according to the second embodiment includes a radio receiving unit 31 and a control unit 33. The control unit 33 includes an extracting unit (extractor) 33A, a reception control unit (reception controller) 33B, a buffer 33C, and a coupling unit (forming unit, coupling circuit, forming circuit) 33D.

When the radio receiving unit 31 succeeds in receiving the packet, the extracting unit 33A receives the received packet from the radio receiving unit 31. Then, the extracting unit 33A extracts, from the received packet, the data unit number $ID_{data}$, the division number $N_{div}$, the divided data unit number $N_{index}$, and the divided data unit and outputs them to the buffer 33C. Further, the extracting unit 33A extracts, from the received packet, the data unit number $ID_{data}$, the division number $N_{div}$, and the divided data unit number $N_{index}$, and outputs them to the reception control unit 33B.

When the reception control unit 33B has not received the data unit number $ID_{data}$, the division number $N_{div}$, and the divided data unit number $N_{index}$ from the extracting unit 33A in each reception interval period, it outputs a reception channel switch signal to the radio receiving unit 31. On the other hand, when the reception control unit 33B has received the data unit number $ID_{data}$, the division number $N_{div}$, and the divided data unit number $N_{index}$ from the extracting unit 33A in each reception interval period, it outputs a reception channel keep signal to the radio receiving unit 31.

Under the control of the reception control unit 33B, the radio receiving unit 31 can repeat the following reception processing over the plurality of reception interval periods. That is, the radio receiving unit 31 executes the reception processing in one reception channel out of the plurality of reception channels. Then, when the radio receiving unit 31 succeeds in receiving, in the one reception interval period, a previous divided data unit over one reception channel, the radio receiving unit 31 executes, in a next reception interval period following the one reception interval period, the reception processing for receiving the next divided data unit following the previous divided data unit over the one reception channel. On the other hand, when the radio receiving unit 31 fails to receive, in the one reception interval period, the previous divided data unit, the radio receiving unit 31 executes, in the next reception interval period, the reception processing for receiving the previous divided data unit over another reception channel that is different from the one reception channel.

Further, when the reception control unit 33B receives, from the extracting unit 33A, the divided data unit numbers $N_{index}$ of all the divided data units generated from one data unit, it transmits the output instruction for these divided data units to the buffer 33C.

The buffer 33C outputs, to the coupling unit 33D, the divided data units indicated by the output instruction received from the reception control unit 33B and the data unit numbers $ID_{data}$, the division number $N_{div}$, and the divided data unit numbers $N_{index}$ corresponding to the respective divided data units.

Based on the divided data unit number $N_{index}$, the coupling unit 33D arranges the $N_{div}$ divided data units received from the buffer 33C in order and then couples the $N_{div}$ divided data units to form (recreate) the original data unit. The formed data unit is output to, for example, a display apparatus. As the display apparatus can receive data unit in which the $N_{div}$ divided data units are coupled in order, it can display the data unit as it is as an image.

Operation Example of Radio Communication System

Figure 7:
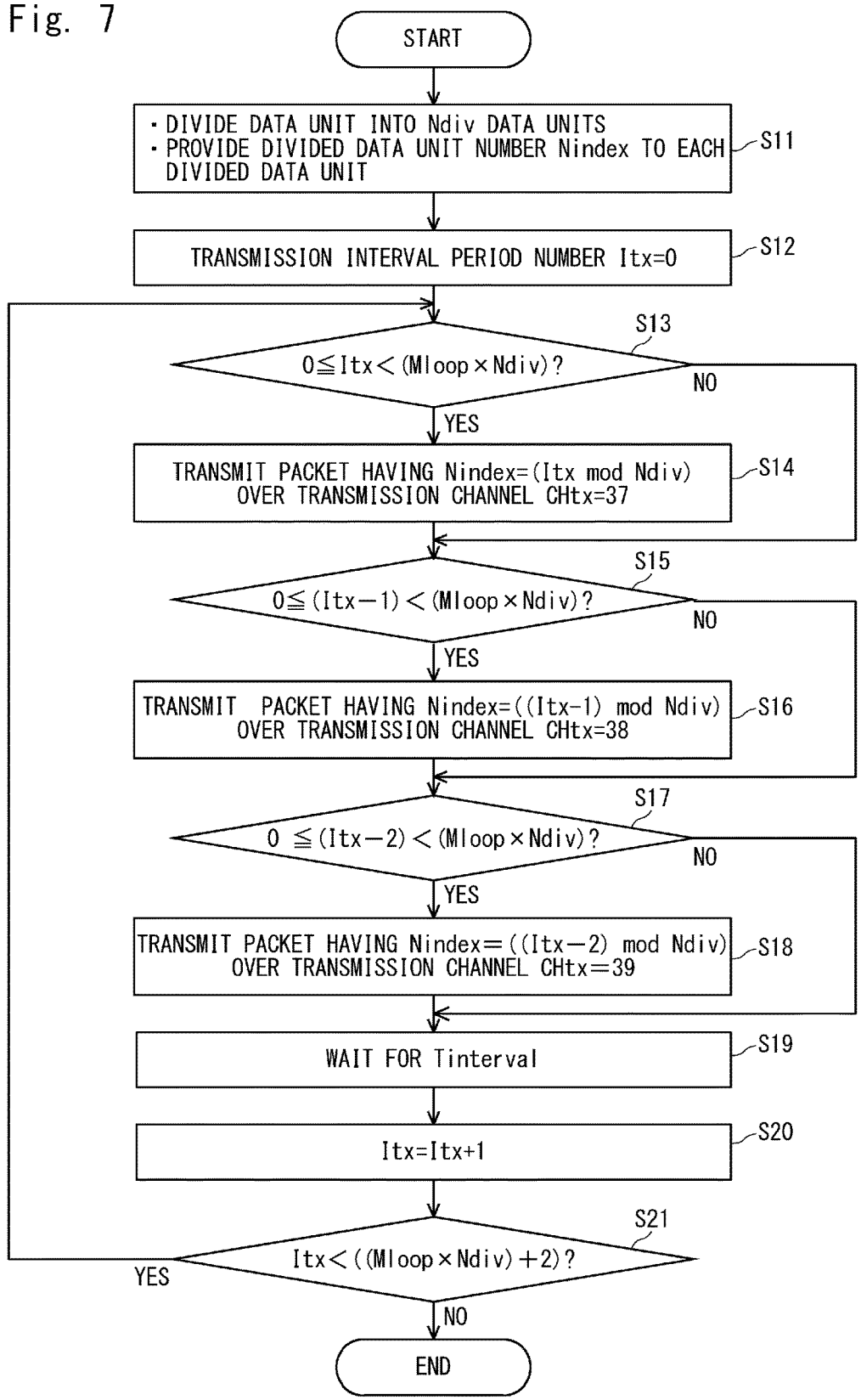
FIG. 7 is a flowchart showing an example of a processing operation of the radio transmitting apparatus according to the second embodiment.
Figure 8:
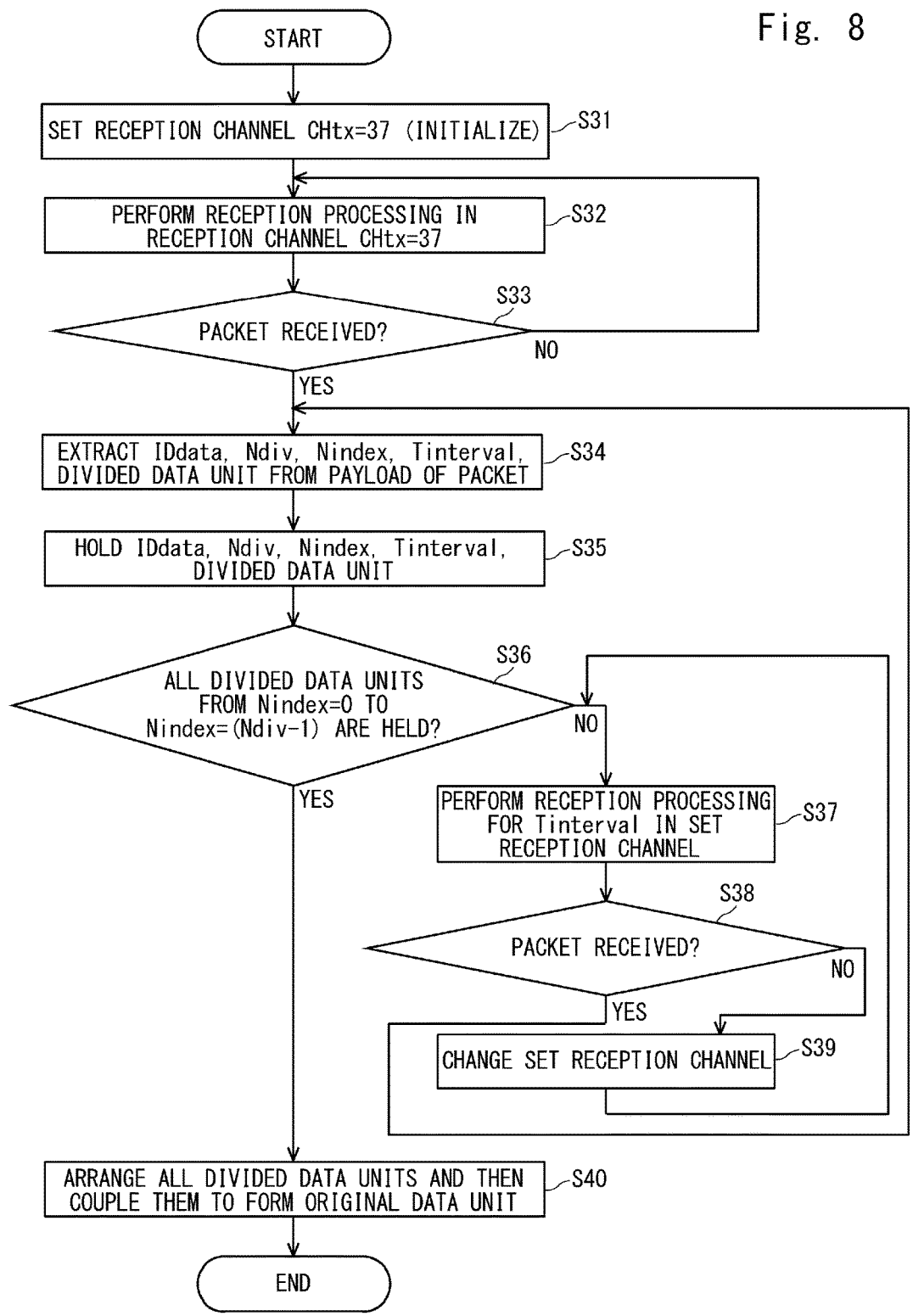
FIG. 8 is a flowchart showing an example of a processing operation of the radio receiving apparatus according to the second embodiment.
Figure 9:
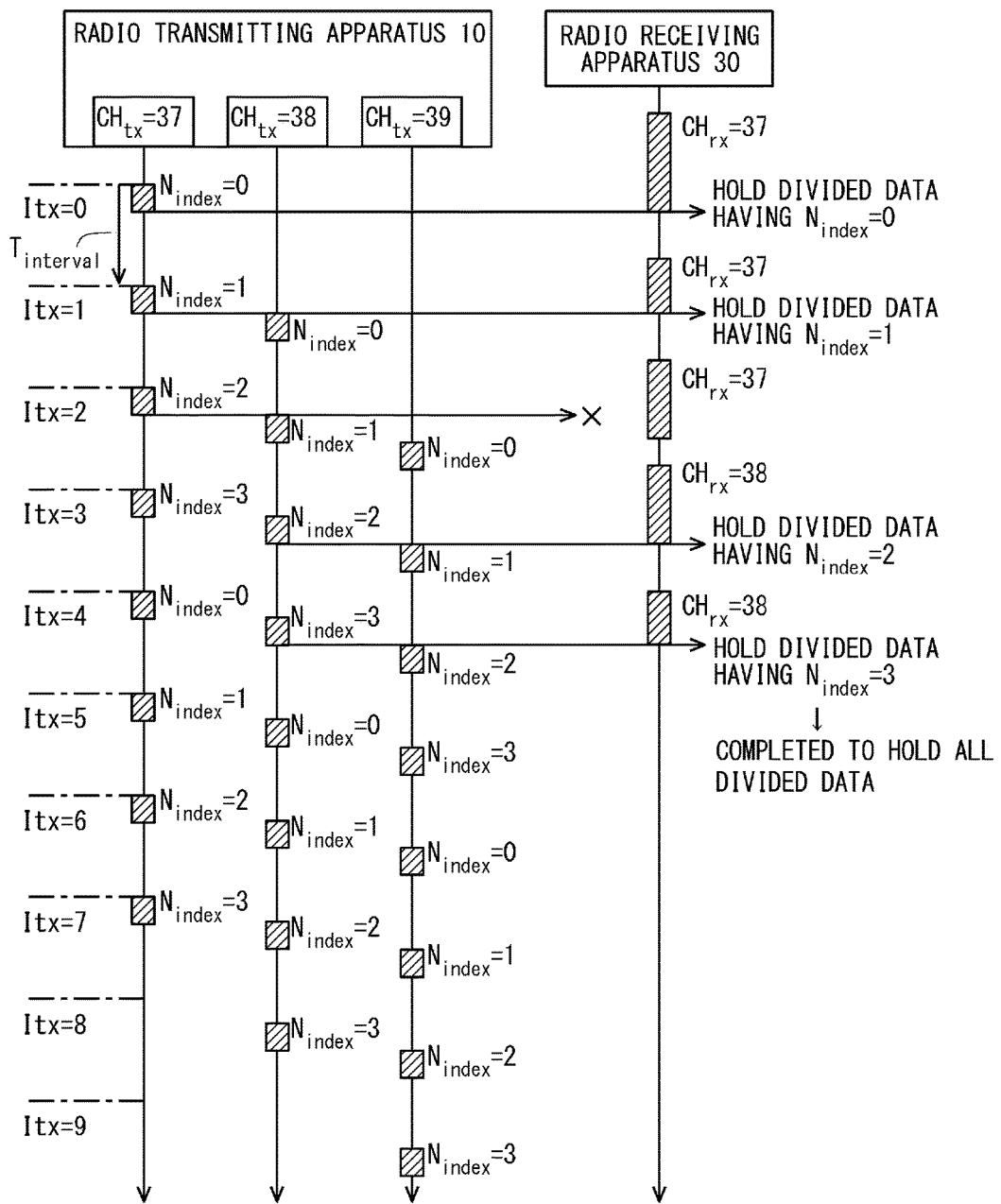
FIG. 9 is a sequence diagram showing an example of a processing operation of a radio communication system according to the second embodiment.

An example of the processing operation of the radio communication system 1 according to the second embodiment with the above configuration will be described. FIG. 7 is a flowchart showing an example of the processing operation of the radio transmitting apparatus according to the second embodiment. FIG. 8 is a flowchart showing an example of the processing operation of the radio receiving apparatus according to the second embodiment. FIG. 9 is a sequence diagram showing an example of the processing operation of the radio communication system according to the second embodiment. In the following descriptions, a case where $M=3$ and $N_{div}=4$ will be described as an example. The three transmission channels (reception channels) are channels $CH_{tx}=37$, 38, and 39.

Processing Operation Example of Radio Transmitting Apparatus

As shown in FIG. 7, in the radio transmitting apparatus 10 according to the second embodiment, the dividing unit 11A divides the data unit into $N_{div}$ ($N_{div}$ is a natural number of two or greater) divided data units and provides the divided data unit number $N_{index}$ to each divided data unit (Step S11). Here, $N_{index}=0$, 1, 2, and 3 are provided to four divided data units, respectively. Then, a set of each divided data unit, the information indicating the division number $N_{div}$, the information indicating the divided data unit number of the corresponding divided data unit, and the information indicating the data unit number $N_{index}$ is output to the buffer 11C. Further, a set of the information indicating the division number $N_{div}$, the information indicating the divided data unit number $N_{index}$ of each divided data unit, and the information indicating the data unit number $ID_{data}$ is output to the transmission control unit 11B.

Next, the transmission control unit 11B sets a transmission interval period number $I_{tx}$ to zero (Step S12).

Next, the transmission control unit 11B evaluates as to whether or not the currently set transmission interval period number $I_{tx}$ falls within a range, the range being zero or greater and less than ($M_{loop} \times N_{div}$) (Step S13).

When the set transmission interval number $I_{tx}$ falls within the range that is zero or greater and less than ($M_{loop} \times N_{div}$) (YES in Step S13), the transmission control unit 11B controls the buffer 11C and the radio transmitting unit 13 to transmit, over the transmission channel $CH_{tx}=37$, the divided data unit having $N_{index}$ that is equal to a remainder of a division of the transmission interval period number $I_{tx}$ by the division number $N_{div}$ (Step S14). When the set transmission interval number $I_{tx}=0$, the remainder with the division number $N_{div}$ becomes zero. Thus, the divided data unit having $N_{index}=0$ is transmitted over the transmission channel $CH_{tx}=37$.

When the set transmission interval number $I_{tx}$ does not fall within the range that is zero or greater and less than ($M_{loop} \times N_{div}$) (NO in Step S13), the processing step skips Step S14 and proceeds to Step S15.

Next, the transmission control unit 11B evaluates as to whether or not a value obtained by subtracting 1 from the set transmission interval period $I_{tx}$ falls within the range that is zero or greater and less than ($M_{loop} \times N_{div}$) (Step S15).

When the value obtained by subtracting 1 from the set transmission interval period $I_{tx}$ falls within the range that is zero or greater and less than ($M_{loop} \times N_{div}$) (YES in Step S15), the transmission control unit 11B controls the buffer 11C and the radio transmitting unit 13 to transmit the divided data unit having $N_{index}$ that is equal to a remainder of a division of the value obtained by subtracting 1 from the transmission interval period number $I_{tx}$ by the division number $N_{div}$ over the transmission channel $CH_{tx}=38$ (Step S16).

When the value obtained by subtracting 1 from the set transmission interval period number $I_{tx}$ does not fall within the range that is zero or greater and less than ($M_{loop} \times N_{div}$) (NO in Step S15), the process skips Step S16 and proceeds to Step S17. When the set transmission interval number $I_{tx}=0$, the value obtained by subtracting 1 from the set transmission interval number $I_{tx}$ does not fall within the range that is zero or greater and less than ($M_{loop} \times N_{div}$). Thus, no packet will be transmitted over the transmission channel $CH_{tx}=38$ in the transmission interval period in which the transmission interval period number $I_{tx}$ is zero.

Next, the transmission control unit 11B evaluates as to whether or not the value obtained by subtracting 2 from the set transmission interval period number $I_{tx}$ falls within the range that is zero or greater and less than ($M_{loop} \times N_{div}$) (Step S17).

When the value obtained by subtracting 2 from the set transmission interval period $I_{tx}$ falls within the range that is zero or greater and less than ($M_{loop} \times N_{div}$) (YES in Step S17), the transmission control unit 11B controls the buffer 11C and the radio transmitting unit 13 to transmit, over the transmission channel $CH_{tx}=39$, the divided data unit having $N_{index}$ that is equal to a remainder of a division of the value obtained by subtracting 2 from the transmission interval period number $I_{tx}$ by the division number $N_{div}$ (Step S18).

When the value obtained by subtracting 2 from the set transmission interval period number $I_{tx}$ does not fall within the range that is zero or greater and less than ($M_{loop} \times N_{div}$) (NO in Step S17), the process skips Step S18 and proceeds to Step S19. When the set transmission interval number $I_{tx}=0$, the value obtained by subtracting 2 from the set transmission interval number $I_{tx}$ does not fall within the range that is zero or greater and less than ($M_{loop} \times N_{div}$). Thus, no packet will be transmitted over the transmission channel $CH_{tx}=39$ in the transmission interval period in which the transmission interval period number $I_{tx}$ is zero.

The transmission control unit 11B waits for the transmission interval $T_{interval}$ (Step S19) and increments the set transmission interval period number $I_{tx}$ (Step S20).

Next, the transmission control unit 11B evaluates as to whether or not the set transmission interval period number $I_{tx}$ is less than (($M_{loop} \times N_{div}$)+2) (Step S21).

When the set transmission interval period number $I_{tx}$ is less than (($M_{loop} \times N_{div}$)+2) (Step S21 YES), the processing step returns to Step S13. On the other hand, when the set transmission interval period number $I_{tx}$ is (($M_{loop} \times N_{div}$)+2) or greater (NO in Step S21), the flow of FIG. 7 ends.

Processing Operation Example of Radio Receiving Apparatus

As shown in FIG. 8, in the radio receiving apparatus 30 according to the second embodiment, the reception control unit 33B sets the reception channel to the channel $CH_{rx}=37$ (Step S31).

Next, the radio receiving unit 31 executes the reception processing in the setting reception channel $CH_{rx}=37$ (Step S32). This reception processing is repeated until the packet is received (NO in Step S33).

When the packet is received (YES in Step S33), the extracting unit 33A extracts, from the received packet, the data unit number $ID_{data}$, the division number $N_{div}$, the divided data unit number $N_{index}$, and the divided data unit (Step S34). The data unit number $ID_{data}$, the division number $N_{div}$, the divided data unit number $N_{index}$, and the divided data unit are output to the buffer 33C. Further, the data unit number $ID_{data}$, the division number $N_{div}$, and the divided data unit number $N_{index}$ are output to the reception control unit 33B.

Next, the buffer 33C holds, as a set, the data unit number $ID_{data}$, the division number $N_{div}$, the divided data unit number $N_{index}$, and the divided data unit (Step S35).

Next, the reception control unit 33B evaluates as to whether or not all the divided data units from $ID_{data}=0$ to $ID_{data}=(N_{div}-1)$ are held in the buffer 33C (Step S36). In the initial stage, as all the divided data units are not yet stored in the buffer 33C (NO in Step S36), the process proceeds to Step S37.

Next, the reception control unit 33B controls the radio receiving unit 31 to execute the reception processing for the transmission interval $T_{interval}$ in the set reception channel (Step S37).

Then, when the packet is received by the reception processing in Step S37 (YES in Step S38), the processing step returns to Step S34. On the other hand, when no packet is received by the reception processing in Step S37 (NO in Step S38), the reception control unit 33B changes the set reception channel (Step S39). In the change of the set reception channel, when the currently set reception channel is the channel $CH_{rx}=37$, it is changed to the channel $CH_{rx}=38$, when the currently set reception channel is the channel $CH_{rx}=38$, it is changed to the channel $CH_{rx}=39$, and when the currently set reception channel is channel $CH_{rx}=39$, it is changed to the channel $CH_{rx}=37$.

On the other hand, when all the divided data units from $ID_{data}=0$ to $ID_{data}=(N_{div}-1)$ are held in the buffer 33C (YES in Step S36), the reception control unit 33B controls the buffer 33C to output all the divided data units to the coupling unit 33D. Then, the coupling unit 33D arranges all the divided data units based on the divided data unit numbers $N_{index}$ and then couples them to form (recreate) the original data unit (Step S40)

Processing Operation Example of Radio Communication System

As shown in FIG. 9, in accordance with the flowchart of FIG. 7, the radio transmitting apparatus 10 transmits the divided data unit having $N_{index}=0$ over the transmission channel $CH_{tx}=37$ in the transmission interval period of $I_{tx}=0$.

In the transmission interval period of $I_{tx}=1$, the radio transmitting apparatus 10 transmits two divided data units having $N_{index}=1$ and 0 over the transmission channels $CH_{tx}=37$ and 38, respectively.

In the transmission interval period of $I_{tx}=2$, the radio transmitting apparatus 10 transmits three divided data units having $N_{index}=2$, 1, and 0 over transmission channels $CH_{tx}=37$, 38, and 39, respectively.

In the transmission interval period of $I_{tx}=3$, the radio transmitting apparatus 10 transmits the three divided data units having $N_{index}=3$, 2, and 1 over the transmission channels $CH_{tx}=37$, 38, and 39, respectively.

That is, in the transmission interval periods from $I_{tx}=2$ to $I_{tx}=7$, the radio transmitting apparatus 10 repeatedly transmits the four divided data units having $N_{index}=0$ to 3 while cyclically shifting, among the three transmission channels, the transmission channel for each of the four divided data units having $N_{index}=0$ to 3.

In the transmission interval period of $I_{tx}=8$, the radio transmitting apparatus 10 transmits the two divided data units having $N_{index}=3$ and 2 over the transmission channels $CH_{tx}=38$ and 39, respectively.

In the transmission interval period of $I_{tx}=9$, the divided data unit having $N_{index}=3$ is transmitted over the transmission channel $CH_{tx}=39$.

On the other hand, in accordance with the flowchart of FIG. 8, the radio receiving apparatus 30 first starts the reception processing in the reception channel $CH_{rx}=37$. In the transmission interval period (reception interval period) of $I_{tx}=0$, the radio receiving apparatus 30 receives the divided data unit having $N_{index}=0$.

Therefore, the radio receiving apparatus 30 executes the reception processing also in the reception channel $CH_{rx}=37$ in the next transmission interval period of $I_{tx}$ period=1 (reception interval period). In the transmission interval period (reception interval period) of $I_{tx}=1$, the radio receiving apparatus 30 receives the divided data unit having $N_{index}=1$.

Therefore, the radio receiving apparatus 30 executes the reception processing also in the reception channel $CH_{rx}=37$ in the next transmission interval period (reception interval period) of $I_{tx}=2$. In FIG. 9, the radio receiving apparatus 30 fails to receive the divided data unit having $N_{index}=2$ in the transmission interval period (reception interval period) of $I_{tx}=2$.

For this reason, the radio receiving apparatus 30 switches the reception channel from the reception channel $CH_{rx}=37$ to the reception channel $CH_{rx}=38$ in the next transmission interval period (reception interval period) of $I_{tx}=3$ and executes the reception processing in the reception channel $CH_{rx}=38$. Here, in the next transmission interval period (reception interval period) of $I_{tx}=3$, the divided data unit having $N_{index}=2$ not received in the transmission interval period (reception interval period) of $I_{tx}=2$ is transmitted over the transmission channel $CH_{tx}=38$. In this manner, the radio receiving apparatus 30 can have an opportunity to receive the divided data unit, which fails to be received in one reception interval period, in the next reception interval period.

Then, the radio receiving apparatus 30 receives the divided data unit having $N_{index}=2$ over the reception channel $CH_{rx}=38$ in the transmission interval period (reception interval period) of $I_{tx}=3$, and receives the divided data unit having $N_{index}=3$ over the reception channel $CH_{rx}=38$ in the transmission interval period $I_{tx}=4$ (reception interval period).

Here, when the radio receiving apparatus 30 receives the divided data units having $N_{index}=3$ over the reception channel $CH_{rx}=38$ in the transmission interval period (reception interval period) of $I_{tx}=4$, the reception of all the divided data units is completed. Therefore, the radio receiving apparatus 30 arranges all the divided data units based on the divided data unit numbers $N_{index}$ and then couples them to form (recreate) the original data unit.

Comparative Example

Figure 10:
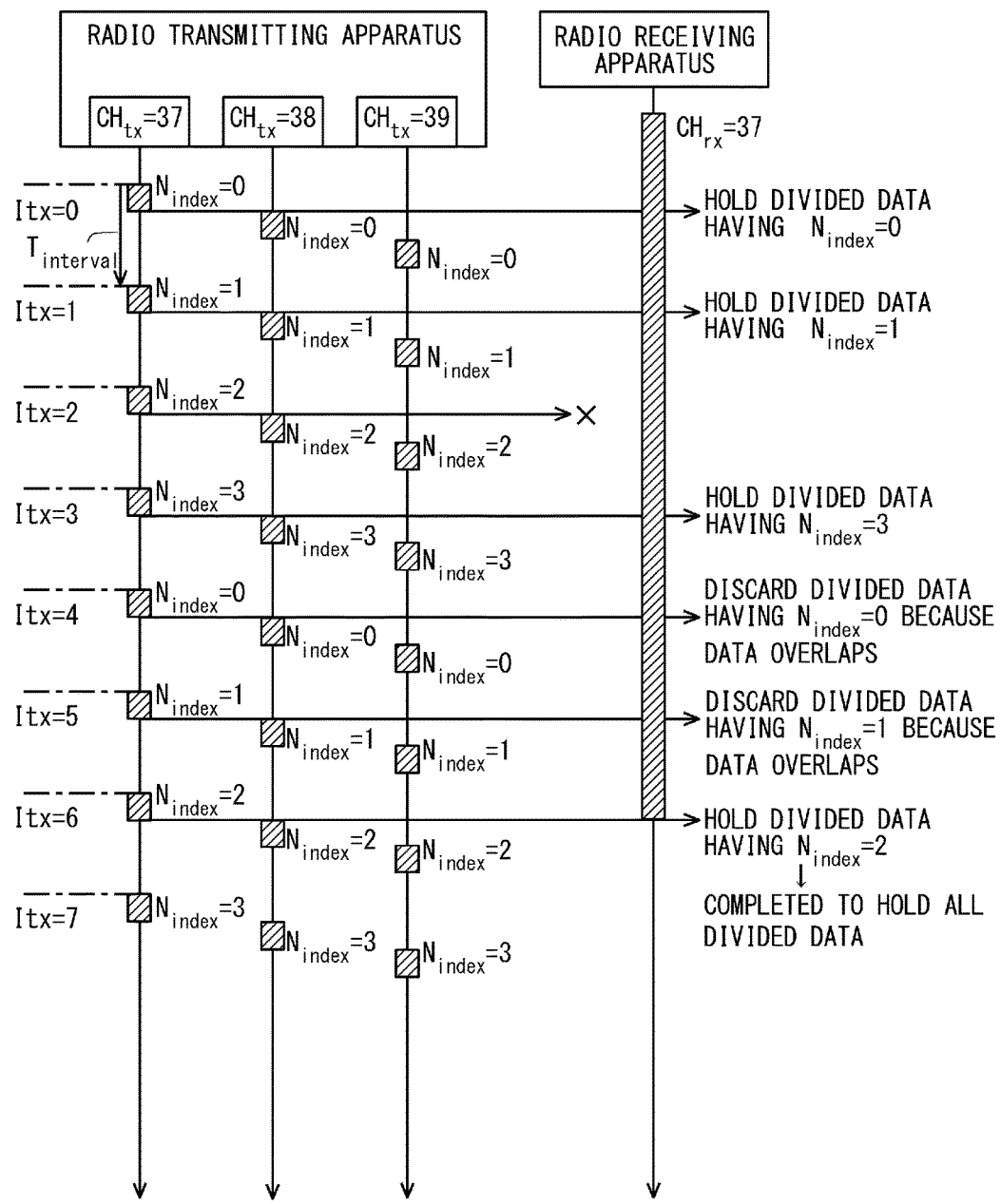
FIG. 10 is a sequence diagram showing a comparative example.

FIG. 10 is a sequence diagram showing a comparative example. In FIG. 10, a radio transmitting apparatus transmits the same divided data units over all of the transmission channels $CH_{tx}$=37, 38, and 39 in one transmission interval period.

According to such a transmission method, when the radio receiving apparatus fails to transmit the divided data unit having $N_{index}$=2 in the transmission interval period (reception interval period) of $I_{tx}$=2, there is no opportunity for the radio receiving apparatus to receive the divided data unit having $N_{index}$=2 until the transmission interval period (reception interval period) of $I_{tx}$=6 even when the reception channel is continuously used or switched. Therefore, the receiving apparatus cannot receive the plurality of divided data efficiently. That is, data transmission is inefficient.

Moreover, in the transmission interval periods (reception interval period) from $I_{tx}$=2 to $I_{tx}$=5, the radio receiving apparatus again receives the divided data units that have already been received. This re-received divided data units are discarded. In this way, the radio receiving apparatus performs unnecessary reception processing.

As described above, according to the second embodiment, in the radio transmitting apparatus 10, the control unit 11 divides the data unit to generate the $N_{div}$ ($N_{div}$ is a natural number of two or greater) divided data units. The radio transmitting unit 13 is configured to transmit the M (M is a natural number of two or greater and $N_{div}$ or less) divided data units in one transmission interval period over the M transmission channels. The radio transmitting unit 13 repeatedly transmits the $N_{div}$ divided data units over the M transmission channels while cyclically shifting, among the M transmission channels, the transmission channel for each of the $N_{div}$ divided data units over the plurality of transmission interval periods.

With this configuration of the radio transmitting apparatus 10, when the radio receiving apparatus 30 fails to receive, in the first receiving period, the first divided data unit over the first reception channel, it can attempt to receive, in the second reception interval period following the first reception interval period, the first divided data unit over the second reception channel that is different from the first reception channel. In this way, there is an opportunity to receive, in the second reception interval period following the first reception interval period, the first divided data unit that fails to be received during the first reception interval period. It is thus possible to efficiently receive data. Moreover, it is possible to switch the first reception channel, over which the first divided data unit fails to be received in the first reception interval period, to the second reception channel that is different from the first reception channel. Therefore, the probability of successful reception can be increased. Consequently, the data can be efficiently received. That is, the efficiency of data transmission can be improved.

Further, in the radio transmitting apparatus 10, the control unit 11 includes a packet generating unit 11D. The packet generating unit 11D generates the packet including the divided data unit, the information necessary for forming the original data unit using the $N_{div}$ divided data units in the radio receiving apparatus 30, and the information indicating the transmission interval corresponding to the time length of the transmission interval period.

With this configuration of the radio transmitting apparatus 10, it is possible for the radio receiving apparatus 30 to execute the reception processing in every reception interval period corresponding to the transmission interval period and to switch the reception channel between the two reception interval periods. Further, in the radio receiving apparatus 30, when reception of all the divided data units is completed, all the divided data units can be coupled to one another to recreate the original data unit.

Furthermore, in the radio transmitting apparatus 10, when the size of the data unit is greater than the payload size of the packet, the control unit 11 divides the data unit.

With this configuration of the radio transmitting apparatus 10, unnecessary division processing can be avoided.

Modified Example

<1> In the above description of the processing operation, it has been assumed that, in the transmission interval period of $I_{tx}$=0, the divided data unit is not transmitted over the transmission channels $CH_{tx}$=38 and 39, and, in the transmission interval period of $I_{tx}$=1, the divided data unit is not transmitted over the transmission channel $CH_{tx}$=39. However, the present disclosure is not limited to this. For example, in the transmission interval period of $I_{tx}$=0, two divided data units having $N_{index}$=3 and 2 may be transmitted over the transmission channels $CH_{tx}$=38 and 39, respectively. Further, in the transmission interval period of $I_{tx}$=1, the divided data unit having $N_{index}$=3 may be transmitted over the transmission channel $CH_{tx}$=39.

In addition, in the above description of the processing operation, it has been assumed that, in the transmission interval period of $I_{tx}$=8, the divided data unit is not transmitted over the transmission channel $CH_{tx}$=37, and, in the transmission interval period of $I_{tx}$=9, the divided data unit is not transmitted over the transmission channels $CH_{tx}$=37 and 38. However, the present disclosure is not limited to this. For example, in the transmission interval period of $I_{tx}$=8, the divided data unit having $N_{index}$=0 may be transmitted over the transmission channel $CH_{tx}$=37. Furthermore, in the transmission interval period of $I_{tx}$=9, two divided data units having $N_{index}$=1 and 0 may be transmitted over the transmission channels $CH_{tx}$=37 and 38, respectively.

In summary, the radio transmitting unit 13 may be configured to transmit M (M is a natural number of two or greater and $N_{div}$ or less) divided data units in one transmission period over M transmission channels. The radio transmitting unit 13 may be able to repeatedly transmit $N_{div}$ divided data units over the M transmission channels while cyclically shifting, among the M transmission channels, the transmission channel for each of the $N_{div}$ divided data units over a plurality of transmission interval periods.

<2> In the above description, it is assumed that a fixed repeat number $M_{loop}$ is used. However, the present disclosure is not limited to this. For example, the transmission control unit 11B may determine the repeat number $M_{loop}$ using the division number $N_{div}$ determined by the dividing unit 11A and a correspondence table in which a plurality of division number ranges and the repeat number $M_{loop}$ corresponding to the division number range are associated.

Figures 11, 12:
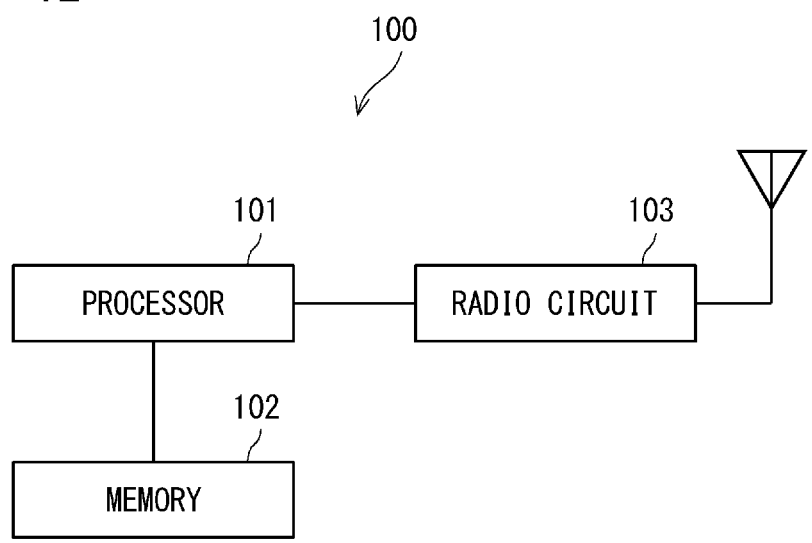
FIG. 11 is a diagram showing an example of a correspondence table.
FIG. 12 is a diagram showing a hardware configuration of a radio communication apparatus.

FIG. 11 is a diagram showing an example of the correspondence table. In the correspondence table shown in FIG. 11, the repeat number $M_{loop}$=10 is associated with a first range in which the division number $N_{div}$ is 1 or greater and less than 4. The repeat number $M_{loop}$=20 is associated with a second range in which the division number $N_{div}$ is 4 or greater and less than 16. The repeat number $M_{loop}$=40 is associated with a third range in which the division number $N_{div}$ is 16 or greater and less than 64. The repeat number $M_{loop}$=60 is associated with a fourth range in which the division number $N_{div}$ is 64 or greater. Using this correspondence table, when the division number $N_{div}$=4 as assumed in the description of the processing operation, the transmission control unit 11B determines the repeat number $M_{loop}$ to be 20 times.

<3> In the above description, the coupling unit 33D arranges $N_{div}$ divided data units in order. However, the present disclosure is not limited to this. For example, the buffer 33C may arrange the divided data units in order, hold them, and output them to the coupling unit 33D in this order.

Other Embodiments

FIG. 12 is a diagram showing a hardware configuration of a radio communication apparatus. Each of the radio transmitting apparatus 10 and the radio receiving apparatus 30 described in the first and second embodiments may have the hardware configuration shown in FIG. 12.

In FIG. 12, the radio communication apparatus 100 includes a processor 101, a memory 102, and a radio circuit 103.

The control unit 11 of the radio transmitting apparatus 10 described in the first and second embodiments is implemented, for example, by the processor 101 reading and executing a program stored in the memory 102. Further, the radio transmitting unit 13 is implemented by the radio circuit 103.

In addition, the control unit 33 of the radio receiving apparatus 30 described in the first and second embodiments is implemented, for example, by the processor 101 reading and executing a program stored in the memory 102. Further, the radio receiving unit 31 is implemented by the radio circuit 103.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the invention made by the present inventor has been described in detail based on the embodiments, it is obvious that the present disclosure is not limited to the above embodiments, and various modifications can be made without departing from the scope of the invention.

The embodiments described above can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A radio receiving apparatus configured to receive a data signal over a plurality of reception channels, the radio receiving apparatus comprising:
   a radio receiver detecting whether a previous divided data unit is received or not; and
   a controller configured to couple a plurality of divided data units received by the radio receiver to form an original data unit,
   wherein the radio receiver is configured to repeatedly perform reception processing over a plurality of reception interval periods, the reception processing being processing in which the reception processing is executed in one reception channel among the plurality of reception channels in one reception interval period,
   wherein when the previous divided data unit is received over the one reception channel in the one reception interval period, the radio receiver executes the reception processing for receiving a divided data unit following the previous divided data unit in the one reception channel in a next reception interval period following the one reception interval period, and
   wherein when the previous divided data unit is not received in the one reception interval period over the one reception channel, the radio receiver executes the reception processing for receiving the previous divided data unit in the next reception interval period over another reception channel different from the one reception channel.

2. The radio receiving apparatus according to claim 1, wherein
   the radio receiver receives each of the divided data units in a form of a packet; and
   the controller comprises an extractor configured to extract the divided data unit, first information, and second information from the received packet, the first information being necessary for coupling the divided data units, and the second information indicating a transmission interval for a radio transmitting apparatus, the transmission interval corresponding to a time length of the reception interval period.

3. The radio receiving apparatus according to claim 2, wherein the controller arranges the plurality of received data units in order based on the first information extracted by the extractor and then couples the plurality of divided data units to form the original data unit.

4. A radio transmitting method comprising:
   dividing a data unit to generate a plurality of divided data units;
   repeatedly transmitting the plurality of divided data units while cyclically shifting, among a plurality of transmission channels, a transmission channel to be used for transmitting each of the divided data units over a plurality of transmission interval periods; and
   generating a packet including each of the divided data units, wherein in the transmitting, the packet is transmitted,
   wherein in the generating of the packet, the packet is generated including information necessary for a radio receiving apparatus, which receives the transmitted packet, to form the data unit using the plurality of divided data units and information indicating a transmission interval corresponding to a time length of the transmission interval period.

5. The radio transmitting method according to claim 4, wherein in the generating of the divided data units, the data unit is divided to generate N divided data units, N being a natural number greater or equal to two, in the transmitting, M divided data units, M being a natural number greater or equal to two and less or equal to N, are transmitted over M transmission channels in one transmission interval period, and the N divided data units are repeatedly transmitted over the M transmission channels while cyclically shifting, among the M transmission channels, the transmission channel for each of the N divided data units over the plurality of transmission interval periods.

6. The radio transmitting method according to claim 4, wherein in the generating of the divided data units, when a size of the data unit is greater than a payload size of the packet, the data unit is divided.

* * * * *